Figure 1:
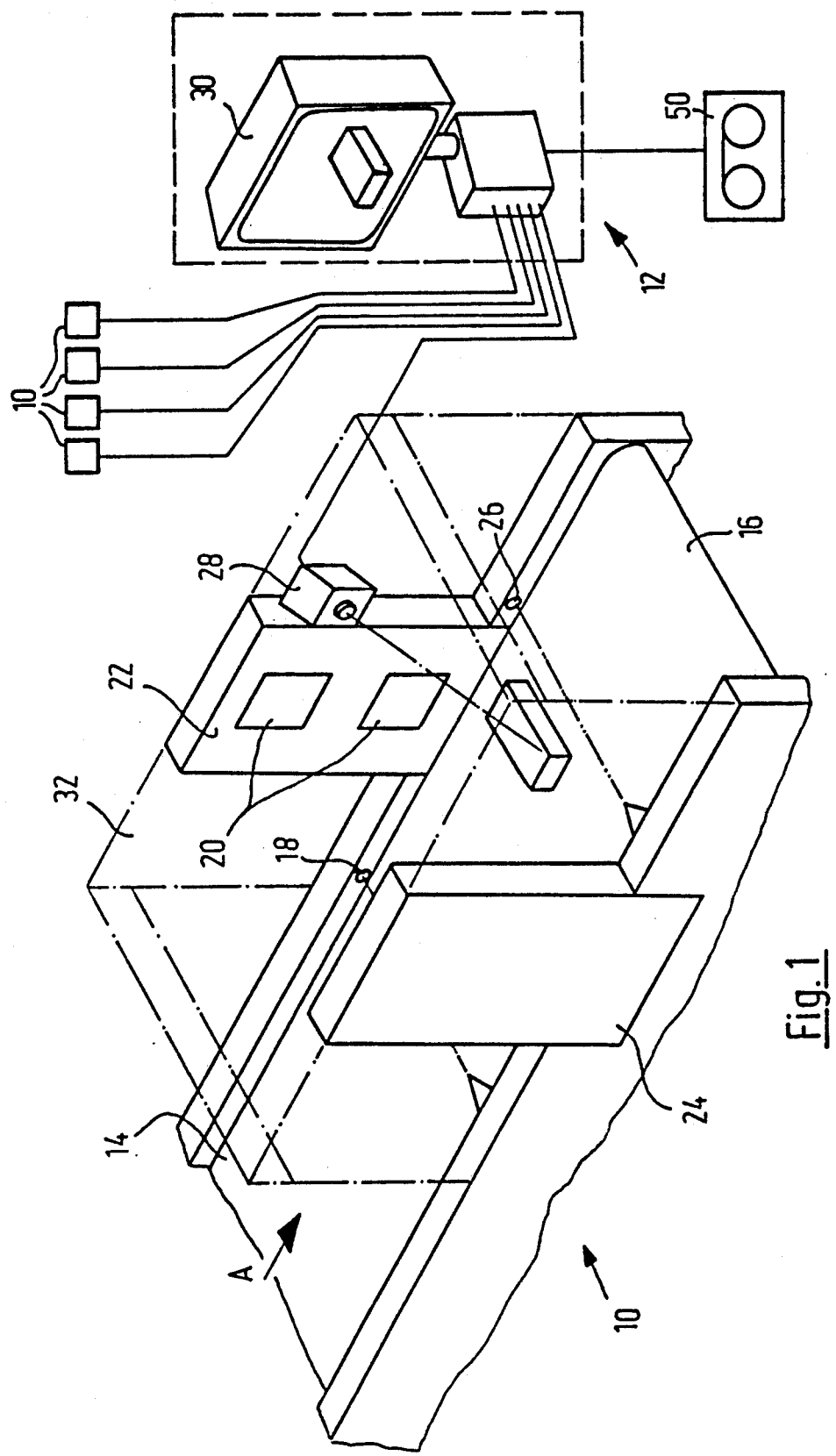

United States Patent [19]

Baitz et al.

[11] Patent Number: 5,025,477
[45] Date of Patent: Jun. 18, 1991

[54] METHOD FOR OPTICALLY SENSING MARKS ON OBJECTS AND APPARATUS FOR CARRYING OUT THE METHOD

[75] Inventors: Guenter Baitz, Berlin; Rudolf Behling, Moelin, both of Fed. Rep. of Germany

[73] Assignee: Siemens Nixdorf Informationssysteme AG, Paderborn, Fed. Rep. of Germany

[21] Appl. No.: 339,054

[22] Filed: Apr. 14, 1989

[30] Foreign Application Priority Data

Apr. 22, 1988 [DE] Fed. Rep. of Germany ....... 3813725

[51] Int. Cl.⁵ ............................................ G06K 9/00
[52] U.S. Cl. ......................................... 382/8; 382/1; 358/101
[58] Field of Search ................ 382/1, 8, 22; 358/101, 358/93; 235/375, 379, 462, 460, 435; 250/555

[56] References Cited

U.S. PATENT DOCUMENTS

| | | | |
|---|---|---|---|
| 3,930,141 | 12/1975 | Koyoma et al. | 382/61 |
| 4,493,103 | 1/1985 | Yamashita et al. | 382/1 |
| 4,727,419 | 2/1988 | Yamada et al. | 382/8 |
| 4,845,770 | 7/1989 | Koshida | 382/65 |
| 4,876,728 | 10/1989 | Roth | 358/101 |
| 4,912,554 | 3/1990 | Neri | 358/107 |
| 4,928,230 | 5/1990 | Kawamura et al. | 235/379 |

Primary Examiner—Michael Razavi

[57] ABSTRACT

In a method for optically sensing markings on objects at a plurality detecting stations (10), at which the objects are transported by means of a transport apparatus through the sensing area of an optical sensing apparatus (20), an object upon non-regular sensing is automatically returned and again transported through the sensing area of the optical sensing apparatus (20) and then after a predetermined number of unsuccessful sensing attempts is automatically represented on a viewing device (30) at a central station (12) for identification of the object and/or a picture of the non-sensed object is stored in a memory (50).

13 Claims, 2 Drawing Sheets

METHOD FOR OPTICALLY SENSING MARKS ON OBJECTS AND APPARATUS FOR CARRYING OUT THE METHOD

The invention concerns a method for optically sensing marks on objects at a number of detecting stations at which the objects are transported by means of a transport apparatus through the sensing area of an optical sensing apparatus.

From DE-OS 31 14 139 an entirely automatic label reading and account keeping combination is known in which a registration of products results from a sensing apparatus located in a tunnel over a conveyor belt. This accounting combination permits principally the registration of products without the presence of a cashier. This happens however only in the case of orderly registration of products. If a product cannot be detected by machine, a sales force must carry out a manual subsequent detection of the non-registered product at the workplace in question. This is time consuming since a sales force is no longer standing available at each workplace. Since this type of accounting system is used predominantly in large sales markets and self-service stores, in which a high throughput of products takes place the saving of time and personnel effected by the automatic registration is largely negated by the high demands made for manual subsequent registration processes.

The object of the invention is to provide a method of the foregoing kind in which the necessity of manual identification and the associated work required by such subsequent identification is smaller than it is in the known solutions.

This object is solved in accordance with the invention in that an object upon a non-regular sensing is automatically returned and transported again through the sensing area of the optical sensing apparatus, and after a predetermined number of fruitless sensing attempts is automatically represented on a viewing device of a central station for the identification of the object and/or a picture of the non-sensed object is stored in a memory. A result of the method of the invention is that, by repeated identification attempts, the probability of sensing failures is reduced and also the objects which are not identified by repeated sensing can be identified at a central workplace by a single work force.

By the storing of the pictures, the work force in the central location is in a position to process several non-recognized objects which are reported simultaneously or shortly after one another from the detecting stations Also, it is possible to have the processing take place at a later point in time. For example, the subsequent detection can be associated with a customer number so that the customer can be sent an accounting.

In a further development of the method of the invention, the object during its transport through the sensing area and/or during its return transport after a non-successful sensing attempt is turned about at least one of its body axes. This has the advantage that an identification marking which previously was arranged in a non-readable position is made readable by a turning of the object. The probability that an identification marking cannot be read is further reduced by this improvement.

If in the method of the invention the optical sensing apparatus and the apparatus for capturing a picture of the object is implemented by a single electronic camera, the detection of the object can preferably so take place that during the sensing process the entire object is captured by the camera, that the camera picture is stored in the picture memory, that by means of a pattern recognition process known in itself the geometric placement of the marking on the object is identified, that the electronic representation of the marking containing camera picture is electronically sensed, and that after a predetermined number of unsuccessful pattern recognitions or sensing attempts the camera picture of the object is delivered to the viewing apparatus and/or is designated in the picture memory as not being recognized. In this case, it is preferable if the electronic camera is pivotal and/or equipped with an objective lens of adjustable focal length, the focal length of the objective lens being first adjusted so that the camera captures the entire object and then after the identification of the geometric place of the marking on the object the camera is so pivoted and/or adjusted in focal length that essentially only the marking is captured by the camera. In this way, the probability of failed readings is greatly reduced.

An apparatus suited to the carrying out of the previously described process includes in an itself known way, a plurality of detecting stations associated with a central station, with each sensing station, being provided with a transport apparatus for the objects to be identified, a tunnel which covers at least a portion of the transport apparatus and an optical sensing apparatus in the tunnel for sensing identification markings on the objects. In accordance with the invention, this apparatus is so constructed that the transport apparatus is divided into at least two successive conveyor areas each having an individually controllable conveying arrangement, that the sensing apparatus is located in the second conveyor area, that before and after the sensing apparatus in the transport direction a sensor arrangement is provided for registering the passage of an object, and that at least a camera is provided in the second conveyor area for supplying pictures to a memory.

The division of the transport apparatus into two successive individually controllable conveyor areas has the purpose that the first conveyor area serves only to receive the objects and to deliver them toward the sensing area, while the second conveyor area serves only for the identification of the objects. Thereby, it is possible to repeatedly transport objects through the sensing area of the optical sensing apparatus in order to carry out several attempts at identification of the object, as a result of which the conveyor arrangement of the first conveyor area has to be stopped, the presentation of objects to the first conveyor apparatus however in general not having to be disturbed.

The sensor arrangement provided in front of the sensing area in the transport direction can serve to turn on the sensing apparatus and the sensing arrangement located after the sensing area in the transport direction can serve to turn off the sensing apparatus. By means of the signal produced by the sensing apparatus, and the pregiven advancement speed of the conveyor arrangement in the second conveying area, the position of an object in the second conveyor area can be exactly determined. The sensor arrangement controls in combination with the sensing apparatus the forward and return movement of the second conveyor apparatus so that the object is repeatedly transported through the sensing area until the sensing apparatus produces an identification signal or until a predetermined number of failed attempts is reached. After this predetermined number of attempts a non-identified object is transported into the viewing area of the camera. Preferably, in this case, the camera is arranged following the sensing apparatus in the transport direction so that a non-identified object need not be transported in the reverse direction again for picturing it on the viewing device.

The sensing arrangements can for example contain ultrasonic sensors, infrared sensors or a laser sensor. In a cost-effective development of the inventive device, the sensor arrangements are made of light barriers with beam paths running generally transversely across the transport direction.

The control of the conveyor arrangements through the sensor arrangements is only possible if the products are advanced individually with a spacing from one another on the conveyor belt so that the sensor arrangements are in a position to individually register each object. In a further development of the invention, a means can be provided in the first conveyor area of the transport apparatus for individualizing the objects to be registered.

In a rapid and reliable realization of the apparatus of the invention, the optical sensing apparatus is made from a beam sensor with a beam deflector, in which the deflection speed of the sensing beam is correlated with the advancement speed of the transport apparatus in the second conveyor area. This allows the ratio of sensing speed and advancement speed to he optimally adjusted for different advancement speeds. The sensing apparatus can include several beam transmitters and/or mirrors, which are so arranged that the objects to be registered are sensed on all sides. Thereby the necessity for placing all of the objects to be registered in a definite position on the transport apparatus is avoided. In combination with the above mentioned method of turning an object during the detection, an optimal sensing result is achieved.

In order to assure an identification of very large objects, in a further development of the apparatus of the invention, the camera is arranged on a carrier adjustable in height relative to the transport plane. Therefore, the viewing field of the camera can be suited to the size of the object to be registered. If the carrier extends transversely over the transport apparatus, a sensing apparatus or mirror for a sensing beam can be arranged on it so that a sensing of an object to be registered can be carried out from above. In order to permit an adjustment of the carrier in dependence on the height of an object perpendicular to the transport plane, it is beneficial if in front of the sensing apparatus in the transport direction a sensor is provided for sensing the height of the objects delivered to the transport apparatus so that the height adjustment of the carrier can then be controlled in dependence on the signals produced by the sensor. The sensor can include a transmitter and a receiver both of which are arranged on the carrier so that a sensing beam is transmitted from the sensor generally parallel to the transport plane and by reflection from an oncoming object is received by the receiver.

Further features and advantages of the invention are apparent from the following description which in connection with the accompanying drawings explain the invention in connection with an exemplary embodiment.

Figure 2:
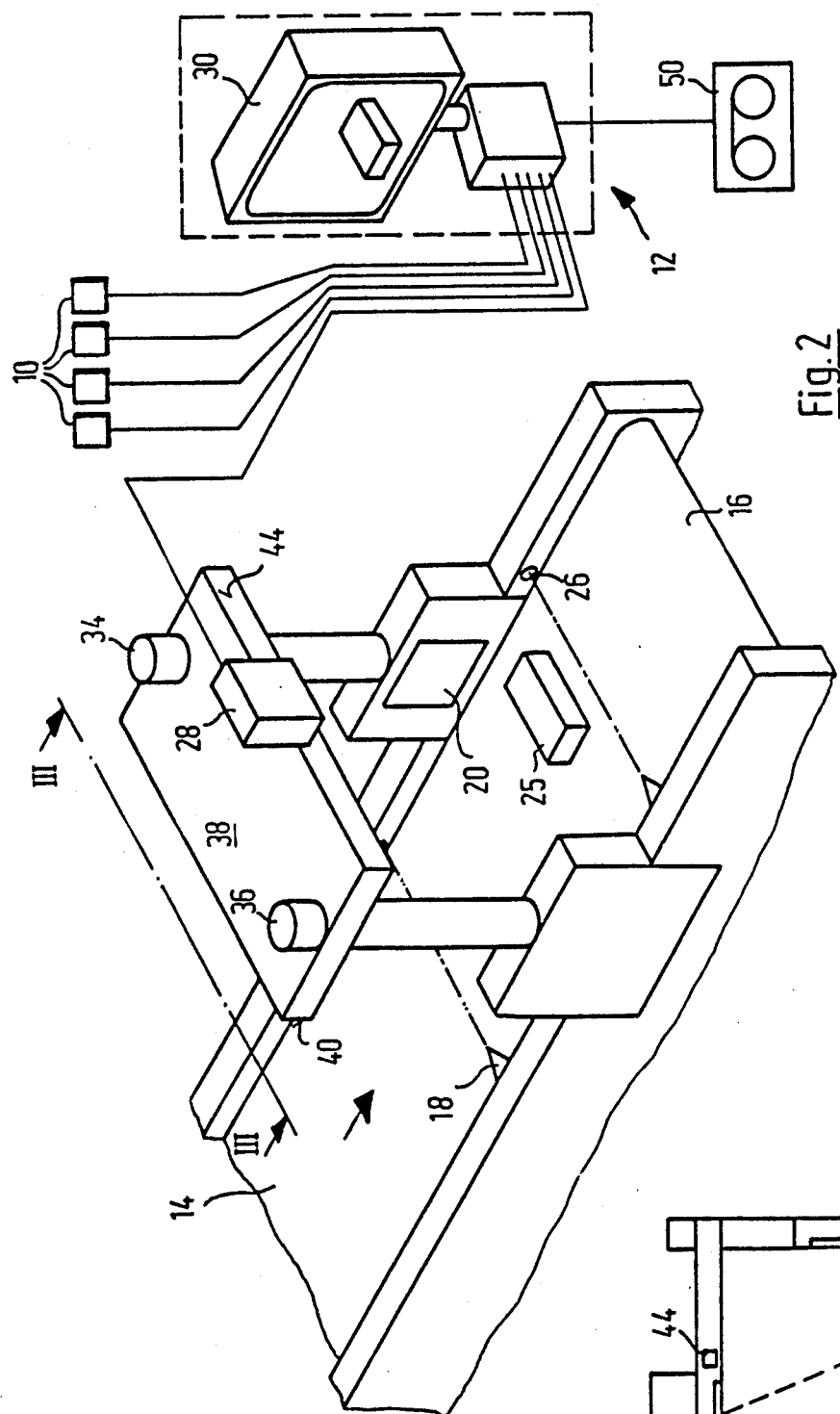
Figure 3:
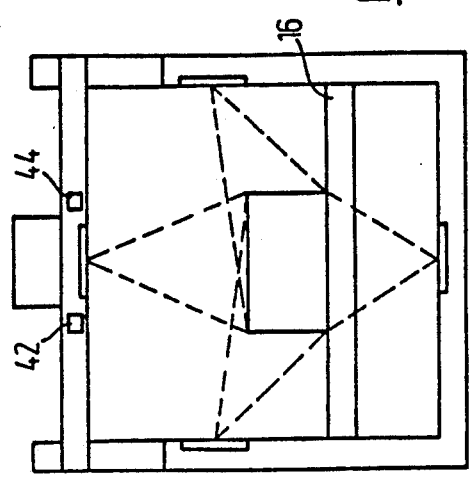

The drawings show:

FIG. 1—A partly schematic perspective view of a work station in an apparatus according to the invention and having five work stations, FIG. 2—a view similar to FIG. 1 of a modified embodiment of the invention, and FIG. 3—a schematic partial section through the apparatus illustrated in FIG. 2 taken along the line III—III, FIG. 1 shows a detecting station 10 for the identification of objects, which station is connected to a control station 12. Further identical detecting stations 10 are also connected with the control station. The detecting station 10 includes a transport device consisting of two conveyor belts 14, 16 arranged in succession. The first conveyor belt 14 serves to receive and forward objects to the second conveyor belt on which the identification of the delivered objects is to take place. An identification is thus possible only if the objects are individually delivered, for which purpose a light barrier is arranged at the beginning of the second conveyor belt so that upon the passage of each individual product a signal is produced.

By means of this signal, a sensing device, indicated in FIGS. 1 to 3 by surfaces 20, is turned on. These surfaces 20 can be mirrors from which a centrally created sensing beam is reflected. They, however, can also be windows behind each of which a beam transmitter is arranged. These surfaces 20 are in the arrangement of FIG. 1 arranged on the inner sides, which face one another, of two vertical upwardly extending studs 22, 24 located on both sides of the conveyor belt 16 at the same point along the transport direction A. Through the sensing apparatus 20 there results a sensing of a marking on an object 25 making possible its identification. This object thereafter passes through a second light barrier 26, which signals that the object has left the sensing area of the sensing apparatus 20. By means of this signal, the sensing apparatus 20 can for example can be turned off if the first light barrier 18 signals the delivery of no further objects. At the end of the second conveyor belt 16, the identified object can be taken from the transport apparatus or can be delivered to a non-illustrated chute type temporary storage facility. If one of the objects signalled by the light barrier 18 as being delivered is not identified by the sensing apparatus 20, the direction of the second conveyor belt 16, upon the passage of the object 25 through the second light barrier 26, is reversed and the object 25 is again returned to the first light barrier 18 upon which the second conveyor belt 16 is once again switched to the transport direction A to cause the object to once again pass through the sensing area of the sensing apparatus 20. If this, after a predetermined number of tries, does not lead to a successful identification, the belt is controlled by the light barriers 18 and 28 to stop so that the object is located in the viewing area of a camera 28 connected with the central station 12. The non-identified object is then pictured on a viewing device 30 in the central station 12 for subsequent identification. In this case, the identification can be made by a person. There exists however also the possibility that the picture delivered by the camera can be automatically evaluated and an identification of the object carried out in such manner. If this is done, the subsequently identified object is transported to the end of the second conveyor belt 16 where it can for example be taken from the transport apparatus. The central station 12 is connected with a plurality of devices 10 of the previously described type with the result that the subsequent identification of objects which are not identified by the sensing apparatus can be carried out centrally for several detecting stations 10.

Further, a picture memory 50 is connected to the central station 12. In this memory, the pictures of the non-identified objects together with information about from which detecting station 10 the picture originates is stored. The subsequent detection and arrangement from the detecting stations 10 can then take place sequentially.

The area above the second conveyor belt 16 is covered by a tunnel like housing 32, in order to avoid endangerment of nearby persons by the sensing beams.

In the case of the embodiment illustrated in FIG. 2 similar parts are again provided with similar reference numbers. In this embodiment, the tunnel shaped housing 32 has been omitted to provide a better overview. In this embodiment, the studs 22, 24, in comparison to the studs 22, 24 of the embodiment of FIG. 1, have a smaller height and have on each of their upper end surfaces a cylindrical guide 34, 36. These cylindrical guides 34, 36 pass through two complementary bores in a carrier plate 38. This plate 38 is adjustable as to height by means of a non-illustrated drive. On the carrier plate 38 is fastened a camera 28. In this way the camera, depending on the height of the object to be identified, can be moved closer to or further from the transport plane of the conveyor belt 16 in order to adjust the viewing angle of the camera to provide an optimal picture of the object. This allows also for a further mirror surface or a further beam transmitter 20 to be arranged on the underside of the carrier plate 38 and directed toward the conveyor belt 16, as is seen in FIG. 3. FIG. 3 shows further another beam transmitter or another mirror 20 below the conveyor belt 16, which belt in this case must be transparent to the beam in question. Thereby a marking applied to the underside of the object can be sensed.

On the edge surface 40 of the carrier plate 38, which is facing the first conveyor belt 14, as seen in FIG. 3, is a sensing arrangement which includes a sending element 42 and a receiving element 44. The arrangement of this sensing apparatus is so carried out that the sender element emits a sensing beam parallel to the upper surfaces of the conveyor belts 14 and 16. If this sensing beam encounters an object on the conveyor belt 14, it is reflected by this object and registered by the receiving element 44. This leads to a control signal to the drive for the carrier plate 38 so as to adjust the carrier plate until the sensing beam is no longer reflected, so that the object can pass under the carrier plate 38 and be viewed by the camera 28.

We claim:

1. An apparatus for optically sensing markings on objects at a plurality of separate detection stations at each of which objects are transported by a transport apparatus through the sensing area of an optical sensing apparatus and whereby an object upon unsuccessful sensing of its markings is viewed by a camera means and a pictorial representation of the object produced by the camera means is transmitted to a central station, each of said detecting stations having a transport apparatus for moving the objects to be identified along a given path, means providing a tunnel at least partially covering a portion of said path, an optical sensing apparatus associated with said tunnel for identifying markings on the objects transported along said path by said transport apparatus, said transport apparatus being divided into at least first and second conveyor areas located successively along said path with each of said first and second areas having associated with it an individually controllable conveyor arrangement, said optical sensing apparatus being associated with said second conveyor area, two sensing arrangements located respectively in front of and following said sensing apparatus with respect to the general direction of movement of objects along said path for registering the passage of an object into and out of association with said optical sensing apparatus, and at least one camera provided in said second conveyor area for forming a pictorial representation of an object located within said second conveyor area which pictorial representation may be transmitted to said central station and/or stored in a memory.

2. An apparatus according to claim 1 further characterized in that said camera is arranged so as to be located after the sensing apparatus with respect to the normal direction of movement of objects along said path.

3. An apparatus according to claim 1 further characterized by said first conveyor area of said transport means having associated with it a means for individualizing objects.

4. An apparatus according to claim 1 further characterized in that one of said sensing arrangements includes a first optical emitter and optical detector located on opposite sides of said path forming a light beam extending transversely across said path in advance of said optical sensing apparatus with respect to the normal direction of movement of objects along said path, and the other of said sensing arrangements includes a second optical emitter and optical detector located on opposite sides of said path and providing a light beam extending transversely across said path following said optical sensing apparatus with respect to the direction of normal movement of objects along said path.

5. An apparatus according to claim 1 further characterized in that said optical sensing apparatus includes at least one beam sensor with a beam deflector, in which the deflection speed of the sensing beam is correlated with the speed at which objects are advanced along said path in said second conveyor area of said transport apparatus.

6. An apparatus according to claim 1 further characterized in said transport apparatus having a horizontal transport plane relative to which objects are supported for movement along said path, and a carrier for said camera adjustable in height relative to said transport plane to vary the spacing between said camera and said transport plane.

7. An apparatus according to claim 6 further characterized in that said carrier extends transversely over said path, and at least a portion of said optical sensing apparatus being arranged on said carrier.

8. An apparatus according to claim 6 further characterized by a height sensor located in front of said optical sensing apparatus with respect to the normal direction of movement of objects along said path for sensing the height of objects delivered by said transport apparatus to said optical sensing apparatus, and means for adjusting the height of said carrier in dependence on signals created by said height sensor.

9. An apparatus according to claim 8 further characterized in that said height sensor includes a transmitter and a receiver both of which are arranged on said carrier, the arrangement of said transmitter and receiver of said height sensor being such that a sensing beam emitted from the transmitter extends generally parallel to said transport plane and upon reflection from an oncoming object falls onto said receiver.

10. A method for optically sensing markings on objects at a plurality of separate detecting stations at each of which objects are transported by a transport apparatus through the sensing area of an optical sensing apparatus, characterized in that an object upon unsuccessful sensing of its markings during its passage forwardly through the sensing area of the sensing apparatus of one of said sensing stations is automatically transported rearwardly and then again passed through the involved sensing area and after a predetermined number of unsuccessful sensing attempts a pictorial representation of the object is automatically captured by the involved sensing apparatus and is transmitted to a central station in communication with all of said separate detecting stations for identification of the object and/or for storage of the pictorial representation of the unsuccessfully sensed object in a memory.

11. A method according to claim 10 further characterized in that the object during its transport through the sensing area and/or during its return transport after an unsuccessful sensing attempt is turned around at least one of its body axes.

12. A method according to claim 10 in which the optical sensing of the markings of an object and the capturing of a pictorial representation of the object is carried out by a single electronic camera, further characterized in that during the sensing process the entire object is captured by the camera, that the camera picture is stored in a picture memory, that by means of a known pattern recognition method the geometric location of the marking on the objects is identified, that the electronic representation of the marking contained in the camera picture is electronically sensed, and that after a predetermined number of unsuccessful pattern recognitions or sensing attempts the camera picture of the object is delivered to a viewing device at the central station and/or is designated in the picture memory as being non-recognized.

13. A method according to claim 12, in which the electronic camera is pivotal and/or is equipped with an objective lens of adjustable focal length, further characterized in that the focal length of the objective lens is first so adjusted that the camera captures the entire object and that after the identification of the geometric location of the marking on the object the camera is so pivoted and/or adjusted as to focal length that essentially only the marking is captured by the camera.

* * * * *